United States Patent
Haynes et al.

(10) Patent No.: US 11,572,840 B2
(45) Date of Patent: Feb. 7, 2023

(54) MULTI-MODE COMBUSTION CONTROL FOR A ROTATING DETONATION COMBUSTION SYSTEM

(71) Applicant: General Electric Company, Schenectady, NY (US)

(72) Inventors: Joel Meier Haynes, Loveland, OH (US); Sarah Marie Monahan, Latham, NY (US); Thomas Michael Lavertu, Ballston Lake, NY (US); Venkat Eswarlu Tangirala, Niskayuna, NY (US); Kapil Kumar Singh, Rexford, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 251 days.

(21) Appl. No.: 16/701,574

(22) Filed: Dec. 3, 2019

(65) Prior Publication Data
US 2021/0164405 A1    Jun. 3, 2021

(51) Int. Cl.
*F23R 7/00* (2006.01)
*F02C 9/26* (2006.01)
*F02C 5/00* (2006.01)

(52) U.S. Cl.
CPC .............. *F02C 9/266* (2013.01); *F02C 5/00* (2013.01); *F23R 7/00* (2013.01)

(58) Field of Classification Search
CPC ...................................................... F02C 9/266
See application file for complete search history.

(56) References Cited

U.S. PATENT DOCUMENTS

| | | | |
|---|---|---|---|
| 3,166,904 A | 1/1965 | Melenric | |
| 5,167,122 A * | 12/1992 | Shekleton | F02C 7/26 60/743 |
| 6,526,936 B2 | 3/2003 | Nalim | |
| 6,883,302 B2 | 4/2005 | Koshoffer | |
| 6,886,325 B2 | 5/2005 | Norris et al. | |
| 6,901,738 B2 | 6/2005 | Sammann et al. | |
| 8,341,932 B2 | 1/2013 | Wiedenhoefer et al. | |
| 9,512,805 B2 | 12/2016 | Snyder | |
| 9,732,670 B2 | 8/2017 | Joshi et al. | |
| 9,856,791 B2 | 1/2018 | Muller et al. | |
| 2003/0056578 A1 * | 3/2003 | Mitchell | F01D 21/003 73/112.01 |

(Continued)

OTHER PUBLICATIONS

U.S. Appl. No. 16/267,473, filed Feb. 5, 2019.

*Primary Examiner* — Todd E Manahan
*Assistant Examiner* — Marc J Amar
(74) *Attorney, Agent, or Firm* — Venable LLP; Peter T. Hrubiec; Michele V. Frank

(57) ABSTRACT

A computer-implemented method for multi-mode operation of a combustion system, a combustion system, and a heat engine are provided. The method includes initializing combustion of a fuel/oxidizer mixture, determining whether conditions at the combustion system meet or exceed a first threshold operating parameter, transitioning to detonation combustion of the fuel/oxidizer mixture if conditions at the combustion system meet or exceed the first threshold operating parameter, and maintaining or increasing fuel flow through a deflagrative fuel circuit if conditions at the combustion system do not meet or exceed the first threshold operating parameter.

20 Claims, 8 Drawing Sheets

(56) References Cited

U.S. PATENT DOCUMENTS

| | | | |
|---|---|---|---|
| 2003/0140614 A1* | 7/2003 | Nearhoof, Sr. | F02C 9/28 60/773 |
| 2004/0216464 A1* | 11/2004 | Lupkes | F23C 15/00 60/776 |
| 2008/0098748 A1* | 5/2008 | Tangirala | F02K 3/06 60/804 |
| 2009/0044542 A1* | 2/2009 | Thatcher | F04D 27/0207 60/773 |
| 2009/0139199 A1* | 6/2009 | Kenyon | F02C 5/02 60/39.39 |
| 2009/0223217 A1* | 9/2009 | Segawa | F42D 3/00 60/532 |
| 2013/0025256 A1* | 1/2013 | Lu | F02C 5/10 60/204 |
| 2013/0118178 A1* | 5/2013 | Sabelhaus | F02C 7/232 60/772 |
| 2013/0213052 A1* | 8/2013 | Brickwood | F23N 5/242 60/776 |
| 2014/0230402 A1* | 8/2014 | Morawski | F02C 7/232 60/39.094 |
| 2018/0179952 A1 | 6/2018 | Peter et al. | |
| 2018/0179953 A1* | 6/2018 | Tangirala | F02C 5/00 |
| 2018/0180289 A1 | 6/2018 | Lavertu, Jr. et al. | |
| 2018/0231256 A1 | 8/2018 | Pal et al. | |
| 2018/0274439 A1 | 9/2018 | Holley et al. | |
| 2018/0355792 A1 | 12/2018 | Pal et al. | |
| 2018/0355793 A1* | 12/2018 | Vise | F23R 3/58 |
| 2018/0355822 A1 | 12/2018 | Vise et al. | |
| 2018/0356093 A1 | 12/2018 | Pal et al. | |
| 2018/0356094 A1 | 12/2018 | Zelina et al. | |
| 2018/0356096 A1 | 12/2018 | Pal et al. | |
| 2019/0264917 A1 | 8/2019 | Pal et al. | |

* cited by examiner

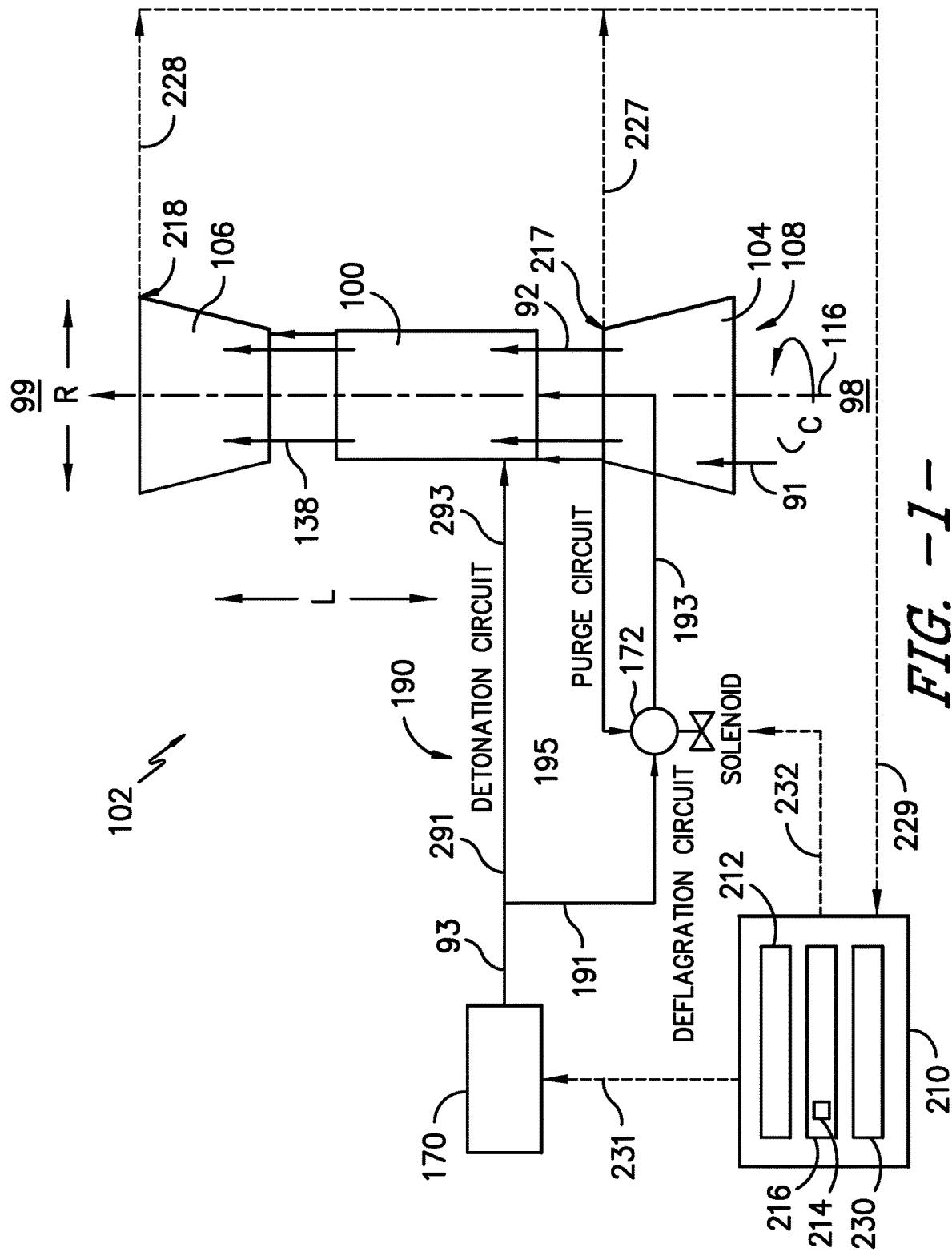
FIG. -1-

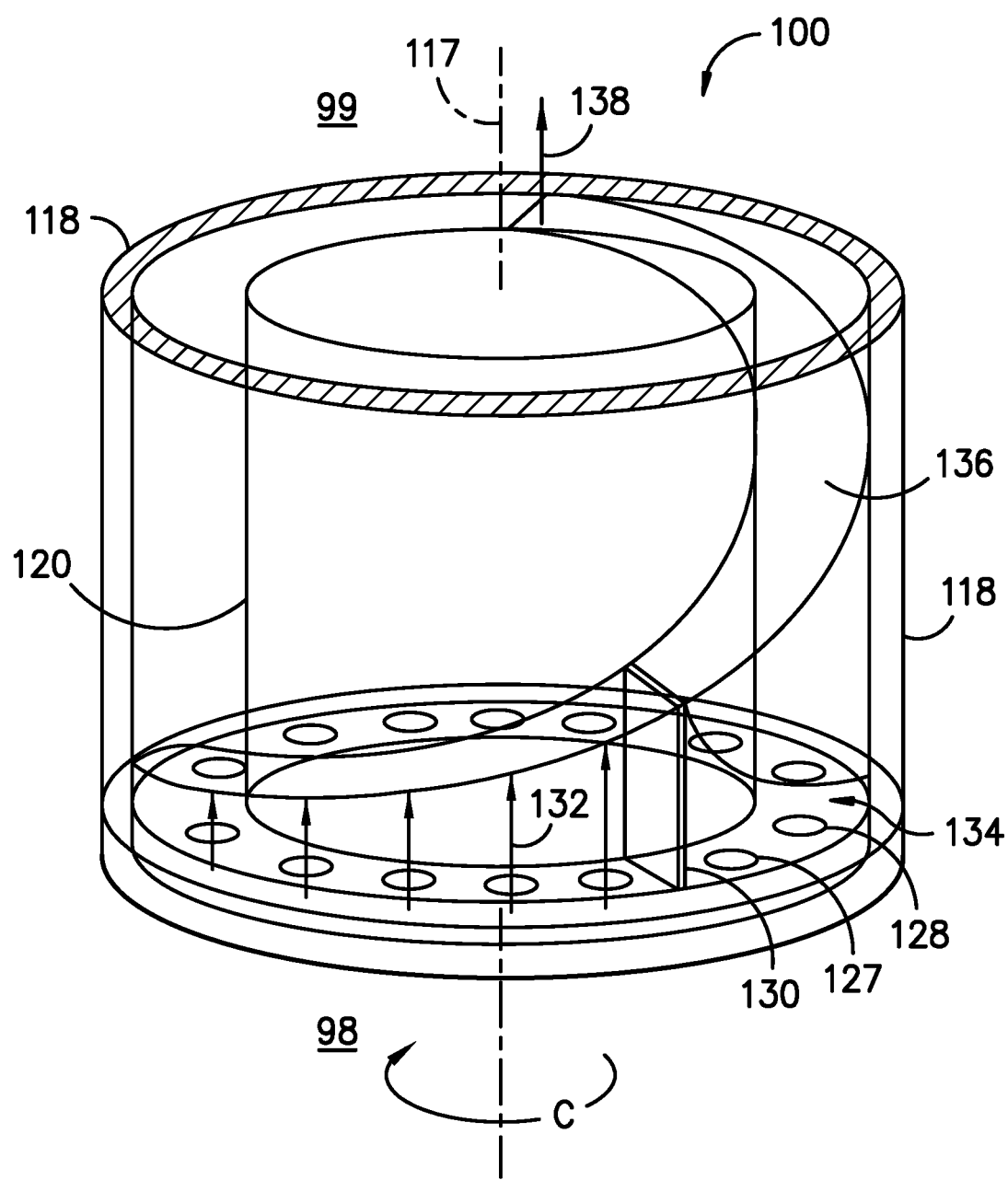
FIG. -2-

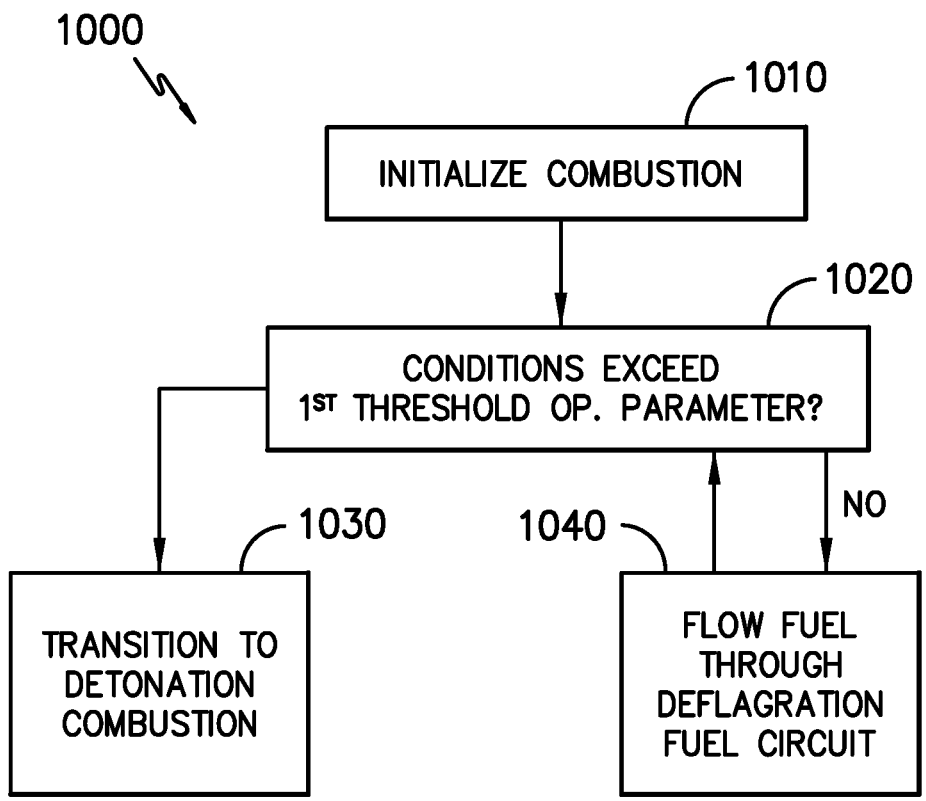
FIG. -3-

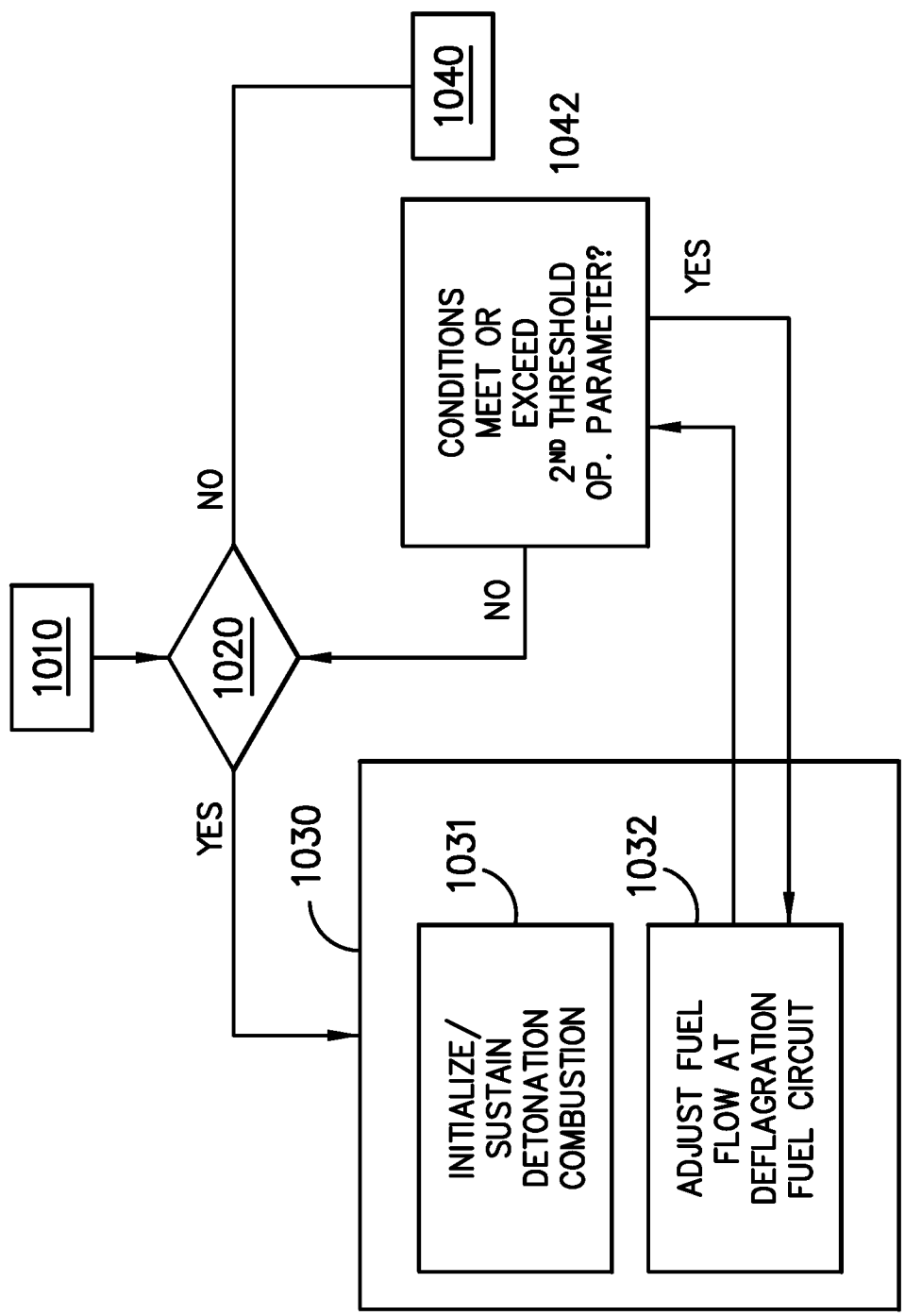
FIG. -4-

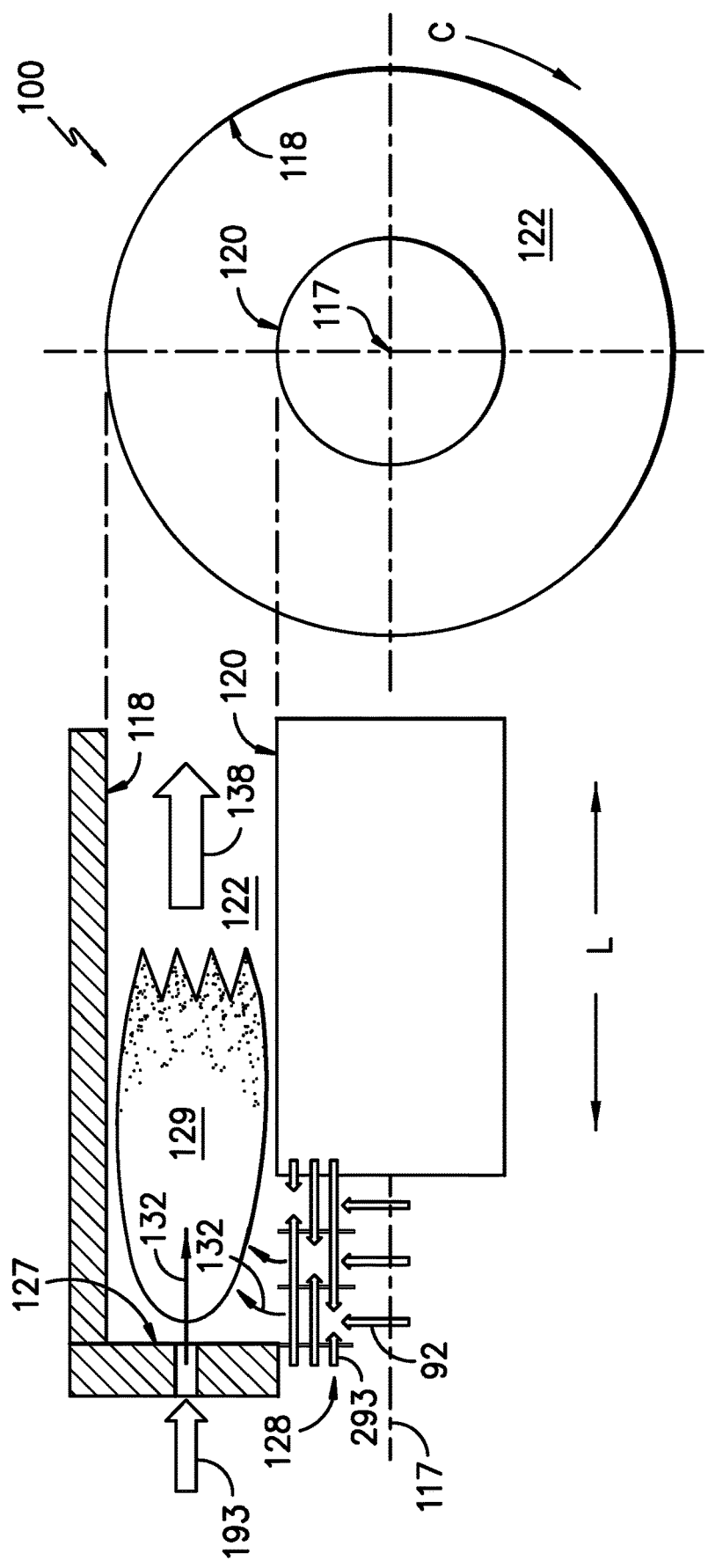
FIG. -5-

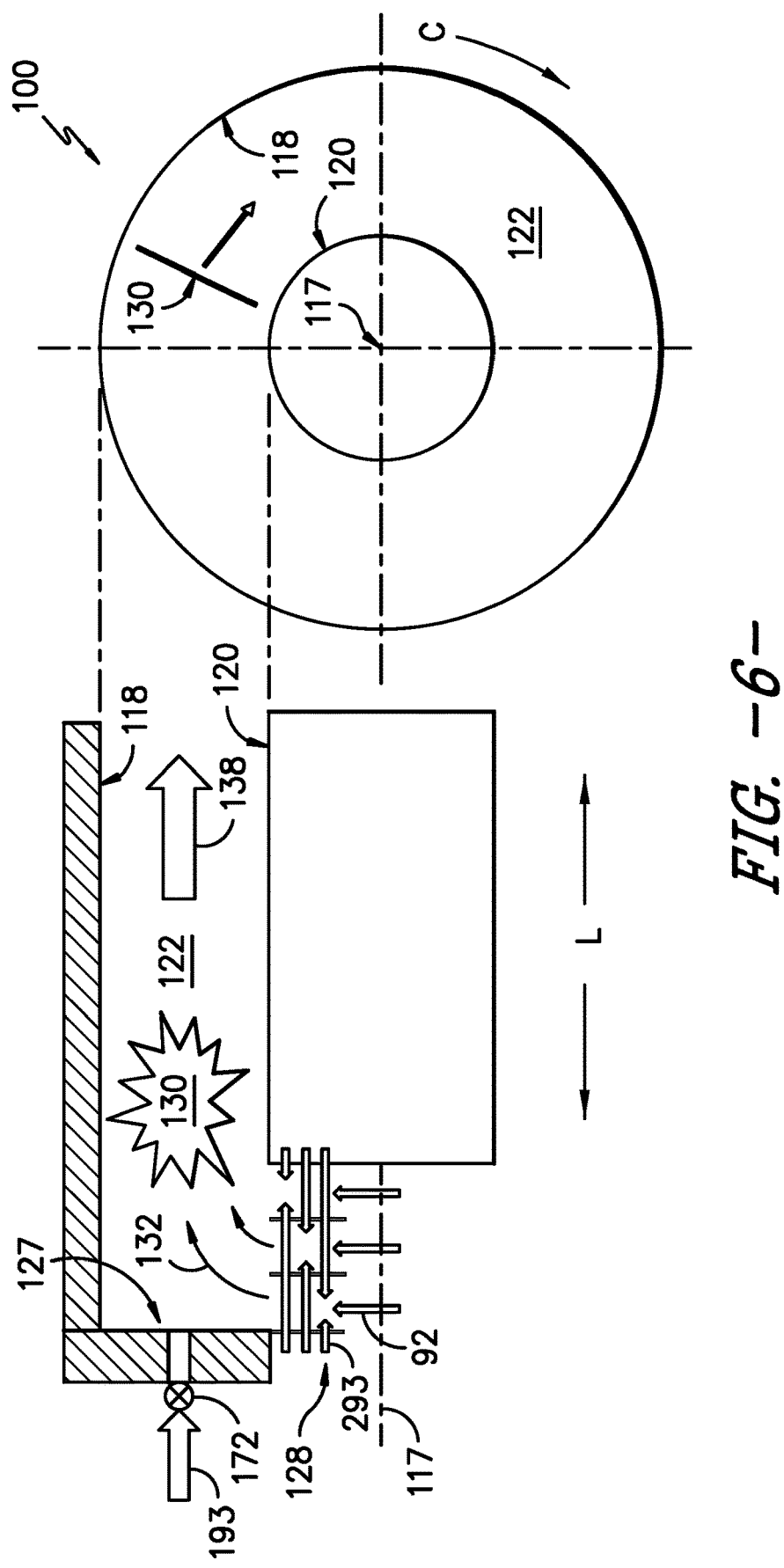
FIG. -6-

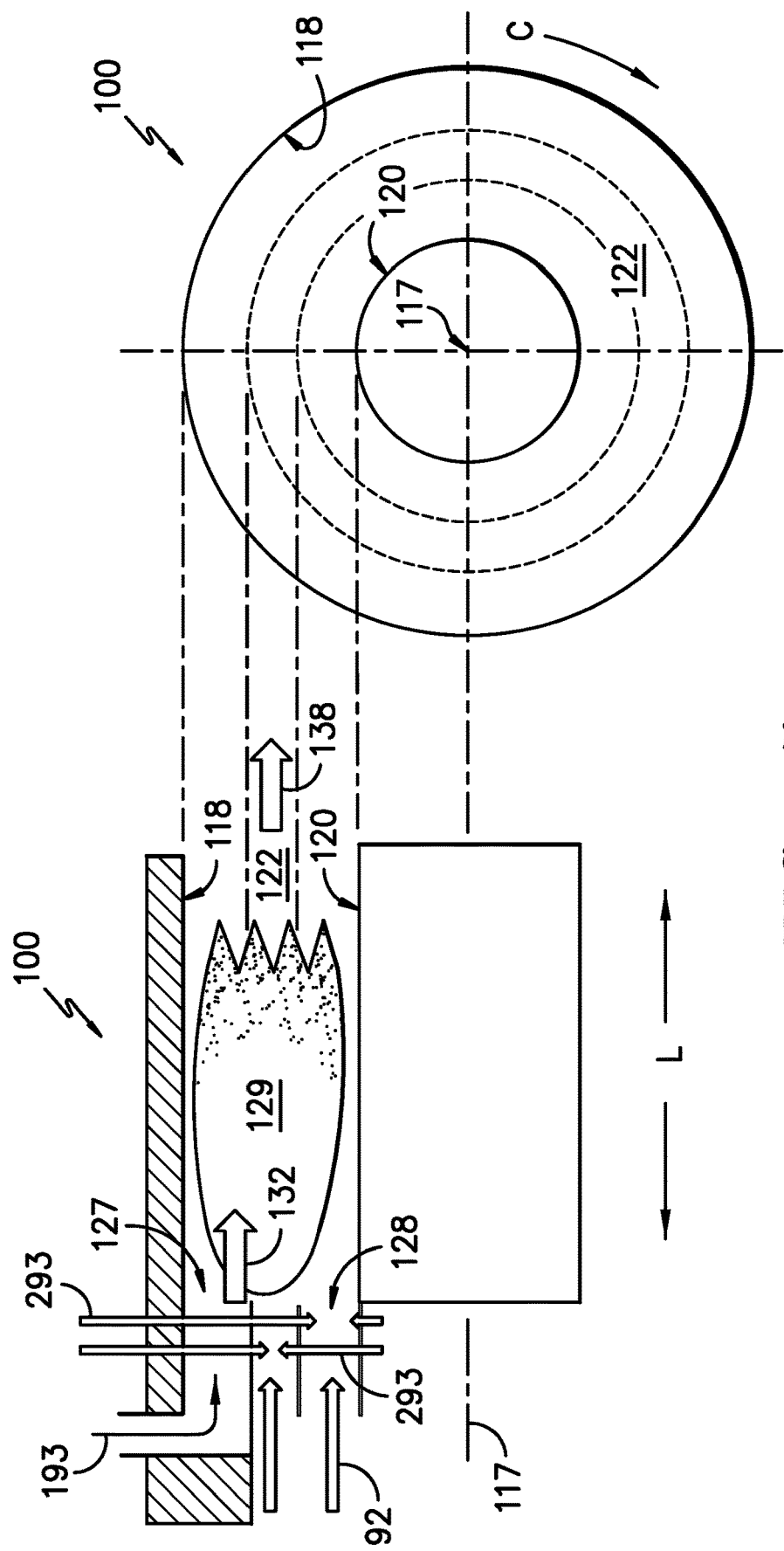
FIG. -7-

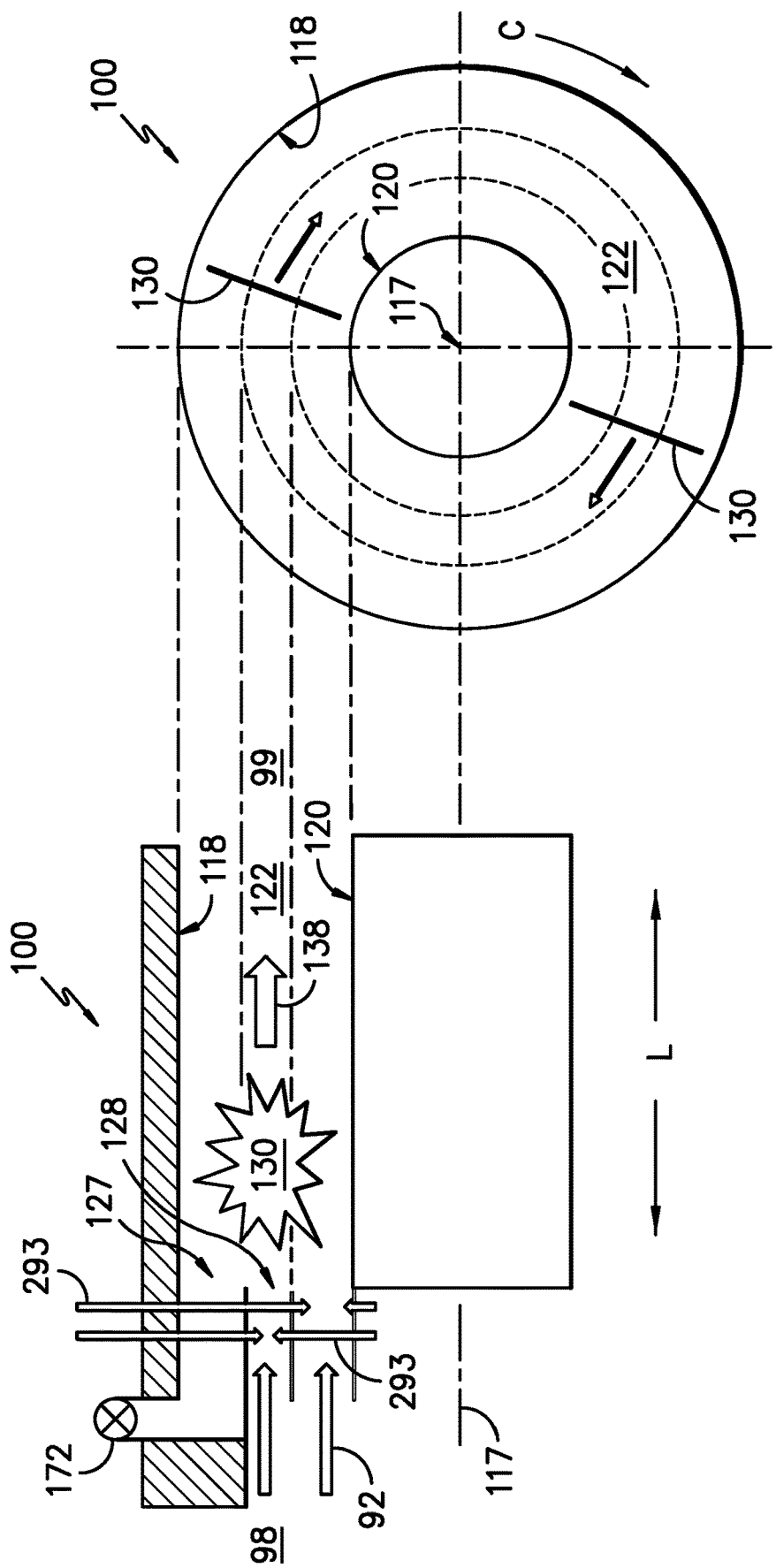
FIG. -8-

MULTI-MODE COMBUSTION CONTROL FOR A ROTATING DETONATION COMBUSTION SYSTEM

FIELD

The present subject matter relates generally to a system of continuous detonation in a propulsion system.

BACKGROUND

Many propulsion systems, such as gas turbine engines, are based on the Brayton Cycle, where air is compressed adiabatically, heat is added at constant pressure, the resulting hot gas is expanded in a turbine, and heat is rejected at constant pressure. The energy above that required to drive the compression system is then available for propulsion or other work. Such propulsion systems generally rely upon deflagrative combustion to burn a fuel/air mixture and produce combustion gas products which travel at relatively slow rates and constant pressure within a combustion chamber. While engines based on the Brayton Cycle have reached a high level of thermodynamic efficiency by steady improvements in component efficiencies and increases in pressure ratio and peak temperature, further improvements are welcomed nonetheless.

Accordingly, improvements in engine efficiency have been sought by modifying the engine architecture such that the combustion occurs as a detonation in a continuous mode. High energy ignition detonates a fuel/air mixture that transitions into a detonation wave (i.e., a fast moving shock wave closely coupled to the reaction zone). The detonation wave travels in a Mach number range greater than the speed of sound with respect to the speed of sound of the reactants. The products of combustion follow the detonation wave at the speed of sound relative to the detonation wave and at significantly elevated pressure. Such combustion products may then exit through a nozzle to produce thrust or rotate a turbine.

However, although detonation combustion can increase engine efficiency, the range of operability of a combustion system and engine is limited by ranges at which detonation can be formed and sustained in a rotating detonation combustion system. As such, there is a need for systems and methods allowing for increased range of operability of a rotating detonation combustion system and engine.

BRIEF DESCRIPTION

Aspects and advantages of the invention will be set forth in part in the following description, or may be obvious from the description, or may be learned through practice of the invention.

An aspect of the present disclosure is directed to a computer-implemented method for multi-mode operation of a combustion system. The method includes initializing combustion of a fuel/oxidizer mixture, determining whether conditions at the combustion system meet or exceed a first threshold operating parameter, transitioning to detonation combustion of the fuel/oxidizer mixture if conditions at the combustion system meet or exceed the first threshold operating parameter, and maintaining or increasing fuel flow through a deflagrative fuel circuit if conditions at the combustion system do not meet or exceed the first threshold operating parameter.

Another aspect of the present disclosure is directed to a combustion system configured to execute steps of the computer-implemented method. The combustion system includes an aft end at which gases exit and a forward end at which a flow of oxidizer enters. The combustion system further includes an outer wall at least partially defining a combustion chamber, a deflagrative fuel circuit configured to provide a first flow of fuel to the combustion chamber, a detonation fuel circuit configured to provide a second flow of fuel to the combustion chamber, and a control valve positioned at one or more of the deflagrative fuel circuit or the detonation fuel circuit, the control valve configured to adjust a fuel split of a total flow fuel between the deflagrative fuel circuit and the detonation fuel circuit. A controller is configured to store instructions that, when executed, perform operations. The operations include determining whether conditions at the combustion system meet or exceed a first threshold operating parameter, transitioning to detonation combustion of the fuel/oxidizer mixture if conditions at the combustion system meet or exceed the first threshold operating parameter, and maintaining or increasing fuel flow through the deflagrative fuel circuit if conditions at the combustion system do not meet or exceed the first threshold operating parameter.

Another aspect of the present disclosure is directed to a heat engine including a combustion system and controller according to aspects of the present disclosure. The heat engine includes a compressor section, an expansion section, and a multi-mode combustion system positioned in serial flow arrangement between the compressor section and the expansion section. The combustion system includes an outer wall at least partially defining a combustion chamber, a deflagrative fuel circuit configured to provide a first flow of fuel to the combustion chamber, a detonation fuel circuit configured to provide a second flow of fuel to the combustion chamber, and a control valve positioned at one or more of the deflagrative fuel circuit or the detonation fuel circuit. The control valve is configured to adjust a fuel split of a total flow fuel between the deflagrative fuel circuit and the detonation fuel circuit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic view of a heat engine including a multi-mode combustion system in accordance with an exemplary embodiment of the present disclosure;

FIG. 2 is a perspective view of a detonation chamber of an exemplary rotating detonation combustion system according to an aspect of the present disclosure;

FIG. 3 is a flowchart outlining steps for a method of multi-mode operation of a combustion system;

FIG. 4 is another flowchart outlining steps for a method of multi-mode operation of a combustion system; and FIGS. 5-8 are schematic cross sectional views of exemplary embodiments of a multi-mode combustion system according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "forward" and "aft" refer to relative positions within a propulsion system or vehicle, and refer to the normal operational attitude of the propulsion system or vehicle. For example, with regard to a propulsion system, forward refers to a position closer to a propulsion system inlet and aft refers to a position closer to a propulsion system nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Embodiments of multi-mode combustion systems and methods for operation are provided herein that can increase engine efficiency and a range of operability. Embodiments provided herein provide a multi-mode combustion system and method for multi-mode operation in which a liquid and/or gaseous fuel is introduced through a diffusion fuel circuit. The deflagrative fuel circuit stabilizes the flame in the combustion/detonation chamber via deflagrative combustion when the operating conditions are insufficient to support detonation combustion. A sensor detects when operating conditions are sufficient to support detonation combustion, in which fuel is transitioned from a deflagrative fuel circuit to a detonation fuel circuit. In certain embodiments, when transition to detonation combustion is at or near completion, the deflagrative circuit undergoes an air or inert gas purge cycle through the deflagrative circuit to remove any remaining fuel from the deflagrative circuit.

Referring now to FIG. 1, a schematic view of an exemplary embodiment of a heat engine 102 including an embodiment of a multi-mode combustion system 100 is provided. The multi-mode combustion system 100 is configured to operate and transition between a deflagrative combustion mode and a detonation combustion mode. The heat engine 102 is generally configured as a propulsion system, power generation system, or turbo machine. More specifically, the heat engine 102 generally includes an inlet or compressor section 104 and an outlet or turbine section 106. In various embodiments, the combustion system 100 is positioned downstream of the compressor section 104. In some embodiments, such as depicted in regard to FIG. 1, the combustion system 100 is positioned upstream of the turbine section 106. During operation, airflow 91 may be provided to an inlet 108 of the compressor section 104, wherein such airflow 91 is compressed through one or more compressors, each of which may include one or more alternating stages of compressor rotor blades and compressor stator vanes. However, in various embodiments, the compressor section 104 may define a nozzle through which the airflow 91 is compressed as it flows to the combustion system 100. Such embodiments may include ramjet or scramjet applications, such that compression of the airflow 91 may be based at least in part on the speed of the airflow 91 entering the inlet or compressor section 104 of the engine 102.

As will be discussed in greater detail below, compressed air 92 from the compressor section 104 may then be provided to the combustion system 100, wherein the compressed air 92 may be mixed with a liquid and/or gaseous fuel 93 and detonated in a detonation chamber 122 (FIG. 2) to generate combustion products 138. The combustion products 138 may then flow to the outlet or turbine section 106 wherein one or more turbines may extract kinetic/rotational energy from the combustion products. As with the compressor(s) within the compressor section 104, each of the turbine(s) within the turbine section 106 may include one or more alternating stages of turbine rotor blades and turbine stator vanes. However, in various embodiments, the turbine section 106 may define an expansion section through which detonation gases 138 are expanded and provide propulsive thrust from the combustion system 100. Such embodiments may include ramjet or scramjet applications. In still various embodiments, the combustion gases or products 138 may then flow from the turbine section 106 through, e.g., an exhaust nozzle to generate thrust for the heat engine 102.

As will be appreciated, in certain embodiments of the engine 102 defining a turbo machine, rotation of the turbine(s) within the turbine section 106, generated by the combustion products 138, is transferred through one or more shafts or spools to drive the compressor(s) within the compressor section 104. In various embodiments, the compressor section 104 may further define a propeller or fan section, such as for a turbofan, turboprop, or propfan engine configuration, such as to propel air across a bypass flowpath outside of the combustion system 100 and turbine section 106.

It will be appreciated that the heat engine 102 depicted schematically in FIG. 1 is provided by way of example only. In certain exemplary embodiments, the heat engine 102 may include any suitable number of compressors within the compressor section 104, any suitable number of turbines within the turbine section 106, and further may include any number of shafts or spools appropriate for mechanically linking the compressor(s), turbine(s), and/or fans. Similarly, in other exemplary embodiments, the heat engine 102 may include any suitable fan section, with a fan thereof being driven by the turbine section 106 in any suitable manner. For example, in certain embodiments, the fan may be directly linked to a turbine within the turbine section 106, or alternatively, may be driven by a turbine within the turbine section 106 across a power gearbox. Additionally, the propeller or fan section may be a variable pitch fan, a fixed pitch fan, a ducted fan (i.e., the heat engine 102 may include an outer nacelle surrounding the fan section), an un-ducted fan or propfan, or may have any other suitable configuration.

Moreover, it should also be appreciated that the combustion system 100 may further be incorporated into any other suitable aeronautical propulsion system, such as a supersonic propulsion system, a hypersonic propulsion system, a turbofan engine, a turboshaft engine, a turboprop engine, a turbojet engine, a ramjet engine, a scramjet engine, etc., or combinations thereof, such as combined-cycle propulsion systems. Further, in certain embodiments, the combustion system 100 may be incorporated into a non-aeronautical power generation system, such as a land-based power-generating propulsion system, an aero-derivative propulsion system, auxiliary power unit, etc. Further, still, in certain embodiments, the combustion system 100 may be incorporated into any other suitable power generation system, propulsion system, or vehicle, such as a manned or unmanned aircraft, a rocket, missile, a launch vehicle, etc. With one or more of the latter embodiments, the propulsion system may not include a compressor section 104 or a turbine section 106, and instead may simply include a convergent and/or divergent flowpath leading to and from, respectively, the combustion system 100. For example, the turbine section 106 may generally define the nozzle through which the combustion products 138 flowing therethrough generate thrust.

Referring still to FIG. 1, and further in conjunction with the perspective view of the exemplary embodiment of a portion of the combustion system 100 in depicted in FIG. 2, the engine 102 includes a fuel system 170 configured to provide a flow of liquid and/or gaseous fuel 93 to the detonation chamber 122 of the combustion system 100. The fuel system 170 generally includes a fuel storage unit. Embodiments of the fuel system 170 may further include heat exchangers, oxygen reduction units or a de-oxygenation device, valves or other control mechanisms for adjusting a rate of fuel flow, or dampers.

Referring still to FIGS. 1-2, the engine 102 generally defines a longitudinal centerline axis 116 that may be common to the heat engine 102, a radial direction R relative to the longitudinal centerline axis 116, and a circumferential direction C relative to the longitudinal centerline axis 116 (see, e.g., FIG. 2), and a longitudinal direction L. The engine 102 defines a forward end 98 and an aft end 99 with respect to the flow of gases 91 entering the inlet 108 of the engine 102 and detonation gases 138 egressing the expansion or turbine section 106 of the engine 102. The forward end 98 may still particularly be defined as a first end proximate to which the compressed air 92 enters the combustion system 100, and the aft end 99 may still particularly be defined as a second end distal to the first end or proximate to which the detonation gases 138 exits the combustion system 100.

Referring now to FIG. 2, in various embodiments, the combustion system 100 includes an outer wall 118 and an inner wall 120 each extended along an axial direction A co-directional to an RDC centerline axis 117. The walls 118, 120 are each extended circumferentially around the centerline axis 117 of the combustion system 100. It should be appreciated that in certain embodiments the centerline axis 117 is coaxial to the centerline axis 116 of the engine 102 depicted in regard to FIG. 1. In other embodiments, the centerline axis 117 defines an acute angle of the combustion system 100 relative to the centerline axis 116 of the engine 102, or such as to define one or more detonation or combustion cans, a plurality of which may be positioned at least partially circumferentially around the centerline axis 116.

Additionally, or alternatively, the axial direction A depicted in regard to FIGS. 2-3 may be co-directional to the longitudinal direction L depicted in regard to FIG. 1. Furthermore, although the walls 118, 120 are depicted as extending substantially along the axial direction A, it should be appreciated that one or more of the walls 118, 120 may extend at least partially radially or curved relative to the centerline line axis 117.

In various embodiments, the combustion system 100 includes an outer wall 118 at least partially defining a detonation/combustion chamber 122 inward of the outer wall 118 along the radial direction R. In certain embodiments, the outer wall 118 and an inner wall 120 together define the detonation/combustion chamber 122. A fuel injector (depicted in regard to FIGS. 5-8) is configured to provide the liquid and/or gaseous fuel 93 to be mixed with the compressed oxidizer 92, together forming a fuel/oxidizer mixture 132, to be burned to produce detonation gases 138.

Referring briefly to FIG. 2, providing a perspective view of the detonation/combustion chamber 122, it will be appreciated that, during at least one mode of operation, the combustion system 100 generates the detonation wave 130. The detonation wave 130 travels in the circumferential direction C of the combustion system 100 consuming an incoming fuel/oxidizer mixture 132 and providing a high pressure region 134 within an expansion region 136 of the detonation combustion. A burned fuel/oxidizer mixture in the form of detonation gases 138 exits the detonation chamber 122 and is exhausted.

More particularly, it will be appreciated that at least one operating mode of the combustion system 100 is of a detonation-type combustor, such as in accordance with a rotating detonation combustion (RDC) system, deriving energy from the continuous wave 130 of detonation. During the detonation combustion mode, the combustion of the fuel/oxidizer mixture 132 is effectively a detonation as compared to a burning, such as during one or more operating modes of the combustion system 100 of the deflagration-type combustion. Accordingly, a main difference between deflagration and detonation is linked to the mechanism of flame propagation. In deflagration, the flame propagation is a function of the heat transfer from a reactive zone to the fresh mixture, generally through conduction. By contrast, with detonation combustion, the detonation is a shock induced flame, which results in the coupling of a reaction zone and a shockwave. The shockwave compresses and heats the fresh mixture 132, increasing such mixture 132 above a self-ignition point. On the other side, energy released by the detonation contributes to the propagation of the detonation shockwave 130. Further, with continuous detonation, the detonation wave 130 propagates around the detonation chamber 122 in a continuous manner, operating at a relatively high frequency. Additionally, the detonation wave 130 during a detonation combustion mode may be such that an average pressure inside the detonation/combustion chamber 122 is higher than an average pressure inside the detonation/combustion chamber 122 during a deflagration combustion mode.

Accordingly, the region 134 behind the detonation wave 130 has very high pressures. Additionally, the detonation combustion mode may generally define a pressure-gain across the longitude of the detonation/combustion chamber 122, rather than a pressure decay generally corresponding to the deflagrative combustion mode.

Referring back to FIG. 1, the combustion system 100 and engine 102 include the fuel system 170 configured to provide a total flow of liquid and/or gaseous fuel 93 to the combustion system 100 via a fuel conduit 190. The total flow of fuel 93 at the fuel conduit 190 is divided into a deflagration fuel circuit 191 and a detonation fuel circuit 291. A control valve 172 is positioned at the fuel conduit 190. In certain embodiments, the control valve 172 is positioned at the deflagration fuel circuit 191. The control valve 172 is configured to modulate, adjust, or otherwise desirably alter a proportion of fuel 93 (i.e., the split between the deflagration fuel circuit 193 and the detonation fuel circuit 293) delivered to the detonation/combustion chamber 122.

Initial operation of the engine 102 may include receiving an initial mass or volumetric flow of air 91 through the inlet 108, such as via a starter, motor/generator, or other airflow condition generally representing a low flow condition relative to higher flows during operation of the combustion system 100. Such low airflow conditions may correspond to a ramjet or scramjet airflow at a condition corresponding to a speed at which the vehicle is traveling when fuel 93 is provided to the detonation/combustion chamber 122 for light-off.

The combustion system 100 and/or the engine 102 includes an upstream sensor 217 configured to measure, calculate, derive, or otherwise obtain a first operating parameter of the airflow 92 entering the combustion system 100. The upstream sensor 217 generally obtains the first operating parameter (depicted schematically via lines 227 in FIG. 1) corresponding generally to input conditions of the airflow 92 to be mixed with the fuel 93 at the detonation/combustion chamber 122. The upstream sensor 217 generates a first signal 227 corresponding to the first operating parameter that is transmitted to the controller 210. In various embodiments, the first operating parameter includes a pressure measurement and/or a temperature measurement corresponding to the airflow 92 such as described above. In certain embodiments, the first operating parameter corresponds to any measurement, calculation, derivation, unit, or other parameter indicative of the aerodynamic and/or thermodynamic condition of the airflow 92 for mixing with the fuel 93 for combustion and/or detonation.

The combustion system 100 and/or the engine 102 includes a downstream sensor 218 configured to measure, calculate, derive, or otherwise obtain a second operating parameter of the gases 138 produced from the combustion system 100. The downstream sensor 218 generally obtains the second operating parameter (depicted schematically via lines 228 in FIG. 1) corresponding generally to output conditions of the gases 138 from detonation and/or combustion of the fuel/air mixture 132 at the detonation/combustion chamber 122. The downstream sensor 218 generates a second signal 228 corresponding to the second operating parameter that is transmitted to the controller 210. In various embodiments, the second operating parameter includes a pressure measurement and/or a temperature measurement corresponding to the gases 138 such as described above. In certain embodiments, the second operating parameter corresponds to any measurement, calculation, derivation, unit, or other parameter indicative of the aerodynamic and/or thermodynamic condition of the gases 138 produced from combusting and/or detonating the fuel/air mixture 132 at the combustion system 100.

It should be appreciated that during certain operating conditions, such as prior to introduction of the fuel 93 to the airflow 92, or prior to combustion/detonation of the fuel/air mixture 132, the second operating parameter and the second signal 228 correspond to the flow of un-burned gases passed through the combustion system 100.

Referring back to FIG. 1, in conjunction with FIGS. 2-8, in certain embodiments, the combustion system 100 further includes a controller configured to adjust, modulate, or otherwise desirably provide fuel or fuel/oxidizer mixtures to the detonation/combustion chamber 122, such as via control of the first fuel injector 127, the second fuel injector 128, the fuel system 170, the control valve 172, or one or more circuits 191, 193, 195, 291, 293. In general, the controller 210 can correspond to any suitable processor-based device, including one or more computing devices. For instance, FIG. 1 illustrates one embodiment of suitable components that can be included within the controller 210. As shown in FIG. 1, the controller 210 can include a processor 212 and associated memory 214 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. In various embodiments, the controller 210 may define one or more of a full authority digital engine controller (FADEC), a propeller control unit (PCU), an engine control unit (ECU), or an electronic engine control (EEC).

As shown, the controller 210 can include control logic 216 stored in memory 214. The control logic 216 may include instructions that when executed by the one or more processors 212 cause the one or more processors 212 to perform operations, such as steps of a method 1000 for multi-mode operation of a combustion system (e.g., combustion system 100) to operate at one or more deflagrative combustion and detonation combustion conditions across desired range(s) of operability of the engine, such as across all or part of a landing-takeoff (LTO) cycle.

Additionally, as shown in FIG. 1, the controller 210 can also include a communications interface module 230. In several embodiments, the communications interface module 230 can include associated electronic circuitry that is used to send and receive data. As such, the communications interface module 230 of the controller 210 can be used to send and/or receive data to/from engine 102 and the combustion system 100. In addition, the communications interface module 230 can also be used to communicate with any other suitable components of the engine 102, including any number of sensors (e.g., sensor 217, 218), valves or flow control devices (e.g., fuel system 170, control valve 172, or other valves, manifolds, orifices, conduits, bleeds, variable vanes, etc. at the engine 102), etc. configured to determine, calculate, modify, alternate, articulate, actuate, adjust, or otherwise control a desired fuel characteristic and/or oxidizer characteristic to the detonation chamber 122, including, but not limited to, fluid flow rate, fluid pressure, fluid temperature, fluid density, fluid atomization, fluid mixture, fluid split or proportion, etc. It should be appreciated that the communications interface module 230 can be any combination of suitable wired and/or wireless communications interfaces and, thus, can be communicatively coupled to one or more components of the combustion system 100 and engine 102 via a wired and/or wireless connection. As such, the controller 210 may obtain, determine, store, generate, transmit, or operate any one or more steps of the method 1000 for operating the combustion system (e.g., combustion system 100) such as described herein, or an apparatus to which the engine 102 is attached. Such apparatuses may include, but are not limited to, aircraft, seacraft, or ground, air, or satellite-based vehicles, in communication with the combustion system 100 and/or heat engine 102 (e.g., a distributed network).

Referring now to FIGS. 3-4, flowcharts outlining exemplary steps of a method for operating a multi-mode combustion system are provided (hereinafter, "method 1000"). Embodiments of the method 1000 depicted and described in regard to FIGS. 3-4 may be implemented and executed in regard to embodiments of the combustion system 100 or engine 102 shown and described in regard to FIGS. 1-2, or further in regard to FIGS. 5-8 further herein. However, it should be appreciated that other embodiments of the method 1000 may be implemented in other combustion systems configured to produce a rotating detonation combustion (RDC) and a deflagrative combustion, and/or other engines from those shown or described herein.

Referring to the flowcharts in FIGS. 3-4, and in conjunction generally to FIGS. 1-8, the method 1000 includes at 1010 initializing combustion of a fuel/oxidizer mixture, such as the fuel/oxidizer mixture 132 shown and described herein. In particular embodiments, the method 1000 at 1010 refers to deflagrative combustion of the fuel/oxidizer mixture 132 at a combustion chamber (e.g., detonation/combustion chamber 122 in FIGS. 1-2 and FIGS. 5-8). It should be appreciated that deflagrative combustion or deflagration generally refers to subsonic combustion or other pressure-loss burning process.

The method 1000 includes at 1020 determining whether conditions at the combustion system meet or exceed a first threshold operating parameter. In certain embodiments, the method 1000 at 1020 is a condition box at a controller (e.g., controller 210 in FIG. 1) based on an input signal (e.g., input signal 229 to the controller 210 in FIG. 1). In various embodiments, the input signal corresponds to a first signal corresponding to a first operating parameter (e.g., from an upstream sensor 217 generating the first signal 227) and/or on a second signal corresponding to a second operating parameter (e.g., from a downstream sensor 218 generating the second signal 228).

In still certain embodiments, the first threshold operating parameter corresponds to a minimum pressure for detonating and/or sustaining detonation of the fuel/oxidizer mixture. Referring to FIGS. 1-2 and FIGS. 5-8, the minimum pressure for detonating and/or sustaining detonation of the fuel/oxidizer mixture 132 corresponds to the first signal defining an input pressure of the airflow 92 to be mixed with the fuel 93 (e.g., pressure downstream of the compressor section 104 and/or upstream of the detonation/combustion chamber 122, such as pressure at or proximate to Station 3 of an engine). In various embodiments, the minimum pressure for detonating and/or sustaining detonation of the fuel/oxidizer mixture 132 corresponds to the second signal defining an output pressure of the gases 138 exiting the combustion system 100 (e.g., pressure of gases downstream of the combustion system 100, such as at the expansion or turbine section 106, or such as at, proximate to, or downstream of Station 4 of an engine).

In certain embodiments, the first threshold operating parameter corresponds additionally, or alternatively, to a minimum temperature for detonating and/or sustaining detonation of the fuel/oxidizer mixture. Referring to FIGS. 1-2 and FIGS. 5-8, the minimum temperature for detonating and/or sustaining detonation of the fuel/oxidizer mixture 132 corresponds to the second signal defining an output temperature of the gases 138 exiting the combustion system 100 (e.g., temperature of gases downstream of the combustion system 100, such as at the expansion or turbine section 106, or such as exhaust gas temperature at, proximate to, or downstream of Station 4 of an engine).

Referring still to the method 1000 at 1020, if the conditions at the combustion system meet or exceed a first threshold operating parameter, the method 1000 includes at 1030 transitioning to detonation of the fuel/oxidizer mixture (e.g., fuel/oxidizer mixture 132), including initialization and sustaining detonation at a detonation chamber of the combustion system (e.g., detonation/combustion chamber 122). In certain embodiments, such as depicted and described in regard to FIG. 1, transitioning to detonation at the combustion system includes transmitting a fuel control signal 231 from the controller 210 to the fuel system 170, in which the fuel control signal 231 corresponds to a desired or commanded total flow of fuel 93 to be delivered to the detonation/combustion chamber 122. In still certain embodiments, transitioning to detonation at the combustion system includes modulating, adjusting, articulating, or otherwise operating the control valve 172, in which operating the control valve 172 adjusts the proportion of fuel 93 or fuel split between the deflagration fuel circuit 193 and the detonation fuel circuit 293.

Referring still to the method 1000 at 1020, if the conditions at the combustion system do not meet a first threshold operating parameter, the method 1000 includes at 1040 maintaining or increasing fuel flow through a deflagration fuel circuit (e.g., deflagration fuel circuit 193 in FIG. 1). The method 1000 at 1040 maintains or increases fuel flow through the deflagration fuel circuit based at least on a desired or commanded operating condition of the combustion system or engine. In some embodiments, such as depicted in regard to FIG. 1, the input airflow 92 to the combustion system 100 does not meet the first threshold operating parameter, such as defining too low of a pressure, a flow rate, and/or temperature to initialize or sustain detonation at step 1030. In certain embodiments, the first threshold operating parameter is insufficient when the output gases 138 from the combustion system 100 define too low of a pressure, flow rate, and/or temperature, such as obtained via the downstream sensor 218. In still certain embodiments, the first threshold operating parameter is insufficient when the input airflow 92 to the combustion system 100 defines too low of a pressure, flow rate, and/or temperature, such as obtained via the upstream sensor 217.

In various embodiments, the method 1000 at 1030 includes at 1031 initializing and/or sustaining detonation of the fuel/oxidizer mixture at the detonation chamber of the combustion system. In still various embodiments, the method 1000 at 1030 includes at 1032 adjusting the flow of fuel at the deflagration fuel circuit based on the desired operating condition of the combustion system and engine. In one embodiment, such as depicted in regard to FIG. 3, adjusting the flow of fuel at the deflagration fuel circuit at 1032 is part of a control loop in which the flow of fuel at the deflagration fuel circuit is increased or decreased based at least on the first threshold operating parameter, such as described above.

In still certain embodiments, such as depicted in regard to FIG. 4, adjusting the flow of fuel at the deflagration fuel circuit at 1032 is part of a control loop in which the flow of fuel at the deflagration fuel circuit is increased or decreased based at least on the first threshold operating parameter, such as described above, and a second threshold operating parameter. The second threshold operating parameter generally corresponds to a maximum pressure for detonating and/or sustaining detonation of the fuel/oxidizer mixture. Referring to FIGS. 1-2 and FIGS. 5-8, the maximum pressure for detonating and/or sustaining detonation of the fuel/oxidizer mixture 132 corresponds to the first signal defining an input pressure of the airflow 92 to be mixed with the fuel 93 (e.g., pressure downstream of the compressor section 104 and/or upstream of the detonation/combustion chamber 122, such as pressure at or proximate to Station 3 of an engine), or the second signal defining an output pressure of the gases exiting the combustion system 100 (e.g., pressure of gases downstream of the combustion system 100, such as at the expansion or turbine section 106, or such as exhaust gas temperature at, proximate to, or downstream of Station 4 of an engine).

Referring to FIG. 4, in various embodiments, the method 1000 includes at 1042 determining whether conditions at the combustion system exceed the second threshold operating parameter. In certain embodiments, the method 1000 at 1042 is a condition box at a controller (e.g., controller 210 in FIG. 1) based on an input signal (e.g., input signal 229 to the controller 210 in FIG. 1). In various embodiments, the input signal corresponds to a first signal corresponding to a first operating parameter and/or on a second signal corresponding to a second operating parameter, such as described above. As depicted in the flowchart outline in FIG. 4, the method 1000 may include a control loop including steps 1032 and 1042. In one embodiment, if the conditions at the combustion system are less than the second threshold operating parameter, the combustion system 100 returns to step 1020 to determine whether conditions at the combustion system meet or exceed the first threshold operating parameter, such as described above. In another embodiment, if the conditions at the combustion system are greater than or equal to the second threshold operating parameter, the combustion system 100 adjusts the flow of fuel at the deflagration fuel circuit, such as described at step 1032. The method 1000 returns to 1042 until the combustion system 100 no longer exceeds the second threshold operating parameter. When the conditions at the combustion system 100 are between the first threshold operating parameter and the second threshold operating parameter, the system proceeds to transition to detonation combustion, such as described in regard to step 1030.

It should be appreciated that in some embodiments, the first threshold operating parameter and the second threshold operating parameter each include a comparison of similar units and/or locations of measurement, such as a comparison of pressures upstream of the combustion system, or a comparison of pressures downstream of the combustion system. In another embodiment, the system 100 and method 1000 further includes a downstream temperature of the gases 138 being less than a threshold temperature. As such, the control loop may include determining conditions relative to pressure and temperature, or other appropriate operating parameters corresponding thereto.

Referring to FIGS. 1-8, detonation of the fuel/oxidizer mixture (e.g., fuel/oxidizer mixture 132) is initiated and sustained at a detonation chamber of the combustion system (e.g., detonation/combustion chamber 122). In certain embodiments, such as depicted and described in regard to FIG. 1, transitioning to detonation combustion at the combustion system (i.e., step 1030 of the method 1000) includes transmitting a fuel control signal 231 from the controller 210 to the fuel system 170, in which the fuel control signal 231 corresponds to a desired or commanded total flow of fuel 93 to be delivered to the detonation/combustion chamber 122. In still certain embodiments, transitioning, initialization, and/or sustaining of detonation at the combustion system includes modulating, adjusting, articulating, or otherwise operating the control valve 172, in which operating the control valve 172 adjusts the proportion of fuel 93 or fuel split between the deflagration fuel circuit 193 and the detonation fuel circuit 293.

As such, transitioning to detonation combustion, such as outlined in regard to the method 1000 at 1030, may include transmitting a valve control signal 232 to the control valve 172 to adjust the proportion of fuel 93 that is split between the deflagration fuel circuit 193 and the detonation fuel circuit 293. In certain embodiments, adjusting the proportion of fuel 93 includes maintaining or increasing the deflagration fuel flow, such as in regard to method 1000 at 1040. In still certain embodiments, adjusting the proportion of fuel 93 includes decreasing the deflagration fuel flow, such as in regard to method 1000 at 1032.

In various embodiments, increasing, maintaining, or decreasing fuel flow across the deflagration fuel circuit maintains the magnitude or quantity of the total flow of fuel 93 delivered to the detonation/combustion chamber 122. For instance, the fuel control signal 231 generally corresponds to the desired or commanded total flow of fuel 93 to the combustion system 100, such as based on airflow conditions entering the combustion system 100 (e.g., airflow 92), desired output thrust or power (e.g., gases 138), or combinations thereof. The valve control signal 232 generally corresponds to the fuel split of the total flow of fuel 93 between the deflagration fuel circuit 193 and the detonation fuel circuit 293. In certain embodiments, transitioning to detonation combustion at 1030 includes maintaining a constant total flow of fuel 93 to the combustion system 100 relative to a constant input condition of the airflow 92.

In still various embodiments, the fuel control signal 231 corresponding to a desired or commanded total flow of fuel 93 may substantially correspond to a rate of airflow (e.g., airflow 92) into the combustion system 100. It should be appreciated that the engine 102 may include any number of valves, manifolds, conduits, bleeds, variable vane angles, heat exchangers, load devices, etc. that may allow for increased airflow 92 into the combustion system 100 at least partially divorced from correlation to pressure and/or temperature of the airflow 92 entering the combustion system 100 or gases 138 exiting the combustion system 100. As such, in certain embodiments, the fuel control signal 231 and the total flow of fuel 93 may substantially correspond to a rate of airflow 92. In still certain embodiments, the valve control signal 232 and the fuel split across circuits 193, 293 may substantially correspond to loading at the compressor section 104 and/or the expansion or turbine section 106, or pressure and/or temperature of the airflow 92 or gases 138.

Furthermore, embodiments of systems and methods provided herein may improve operability of engines including deflagrative combustion and detonation combustion systems. In various embodiments, the method 1000 at 1010 corresponds to a start-up, ignition, re-light, idle, or other low power condition of an engine. In still various embodiments, the method 1000 at 1030 may generally correspond to a cruise, climb, takeoff, or generally mid-power or greater condition at the engine. In certain embodiments, the method 1000 at 1010 is performed when the signal downstream of the combustion system (e.g., the second signal 228 from the second sensor 218) is at or below approximately 50 psi or approximately 3.45 bar.

In certain embodiments, the method 1000 is stored, at least in part, as instructions in a controller (e.g., controller 210) that, when executed, perform operations in accordance to one or more steps of the method 1000 outlined and described herein. However, in other embodiments, the combustion system 100 and/or engine 102 is configured to passively control or operate the combustion system 100 and execute one or more steps of the method 1000 described herein. For instance, certain steps may directly provide signals (e.g., signal 227, 228) from one or more sensors (e.g., sensors 217, 218) directly to one or more pressure or flow control devices, orifices, manifolds, conduits, circuits, or control valves (e.g., control valve 172, fuel system 170, etc.) shown or described herein. In still another embodiments, the combustion system 100 and/or engine 102 is configured to modulate, adjust, articulate, open or close, or otherwise alter, mechanically based on a signal including pressure or temperature such as described herein.

Referring now to FIGS. 5-8, embodiments of the combustion system 100 are provided, such as shown and described in regard to FIGS. 1-2, and further such as described in regard to the method 1000 outlined in FIGS. 3-4. FIGS. 5-8 schematically depict a longitudinal cross sectional view of embodiments of the combustion system 100 and corresponding circumferential flowpath views. FIGS. 5-6 schematically depict a multi-mode combustion system including a radial RDC system in which the radial RDC system includes a radial injection of fuel/oxidizer mixture 132 from the detonation fuel circuit 293 and compressed oxidizer 92. FIGS. 7-8 schematically depict a multi-mode combustion system including an axial or longitudinal RDC system in which the longitudinal RDC system includes an axial injection of fuel/oxidizer mixture 132 from the detonation fuel circuit 293 and compressed oxidizer 92. In regard to the axial or longitudinal RDC system depicted in FIGS. 7-8, the mixture of fuel 293 and oxidizer 92 is substantially co-directional to the flow of fuel 193 entering the detonation/combustion chamber 122. In regard to the radial RDC system depicted in FIGS. 5-6, the mixture of fuel 293 and oxidizer 92 is directionally acute, oblique, or perpendicular to the flow of fuel 193 entering the detonation/combustion chamber 122.

Referring to FIGS. 5-8, as well as depicted in regard to FIG. 2, the deflagration fuel circuit 193 provides a first flow of fuel through a first fuel injector 127. The first flow of fuel and the oxidizer 92 together mix to produce a fuel/oxidizer mixture 132 to the detonation/combustion chamber 122. The mixture 132 is burned via deflagrative combustion 129, such as via an igniter (not shown) and such as described in regard to method 1000, to produce combustion gases 138. The detonation fuel circuit 293 provides a second flow of fuel through a second fuel injector 128. The second flow of fuel and the oxidizer 92 together mix to produce a fuel/oxidizer mixture 132 to the detonation/combustion chamber 122. The mixture 132 is detonated to produce a detonation shockwave 130, such as depicted and described in regard to FIGS. 2-4.

It should be appreciated that during deflagrative combustion, such as depicted in regard to FIGS. 5 and 7, the deflagrative combustion 129 of the mixture 132 may include fuel from the deflagration fuel circuit 193 and the detonation fuel circuit 293. As such, the fuel/oxidizer mixture 132 during a deflagrative combustion mode may include fuel from the deflagration fuel circuit 193 and the detonation fuel circuit 293. In certain embodiments, the detonation fuel circuit 293 provides at least a portion of the fuel 93 therethrough to the detonation/combustion chamber 122 during a deflagrative combustion mode. In some embodiments, the detonation fuel circuit 293 is further configured as a pilot fuel source, in which the second fuel injector 128 is a pilot fuel nozzle configured to provide substantially stable combustion at one or more low or mid-power conditions during the deflagrative combustion mode. It should be appreciated that stable combustion generally includes combustion substantially free of undesired pressure oscillations (e.g., combustion acoustics or noise), combustion providing low emissions (e.g., unburned hydrocarbons, oxides of nitrogen, oxides of carbon, smoke, or other emissions), combustion configured for light-off, altitude re-light, or configured against lean- or rich-blowout, or other standards or regulations such as may be suggested or required by the International Civil Aviation Organization (ICAO), the Federal Aviation Administration (FAA), the European Union Aviation Safety Agency (EASA), or other administrative or governing body, or other applicable standard.

During a detonation combustion mode, fuel from the deflagration fuel circuit 193 is reduced or eliminated, such as via closing the control valve 172 such as described in regard to method 1000, and such as depicted in regard to FIGS. 6 and 8. In some embodiments, the engine 102, combustion system 100, or method 1000, a purge circuit 195 is included. The purge circuit 195 is configured to provide a flow of oxidizer or inert gas to the deflagration fuel circuit 193. The purge circuit 195 removes fuel from the deflagration fuel circuit 193, such as to mitigate or eliminate the risk of fuel coking within the deflagration fuel circuit 193 and/or first fuel injector 127. In some embodiments, the purge circuit 195 provides a substantially continuous purge flow through the deflagration fuel circuit 193 during a detonation combustion mode. In certain embodiments, the flow of oxidizer or inert gas through the purge circuit 195 and the deflagration fuel circuit 193 defines a greater pressure than the pressure generated via the detonation shockwave 130 during a detonation combustion mode. As such, the purge circuit 195 may prevent a fluid from traveling from the detonation/combustion chamber 122 to the deflagration fuel circuit 193.

Embodiments shown and described in regard to FIGS. 1-8 may include elements, features, reference numerals, details, or methods for operation shown or described in regard to one figure and not necessarily shown or described in regard to another figure. It should further be appreciated that one or more figures may omit certain features for the sake of clarity. Furthermore, elements, features, reference numerals, details, or descriptions or depictions of method for operation may be distributed across two or figures for the sake of clarity. It should be appreciated that elements, features, reference numerals, details, or methods shown or described in regard to one figure are applicable to any or all other figures provided herein unless otherwise stated. As such, combinations of elements, features, reference numerals, details, or methods shown or described herein in regard to two or more figures may constitute an embodiment within the scope of the present disclosure as if depicted together in a single figure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A computer-implemented method for multi-mode operation of a combustion system, the method comprising initializing combustion of a fuel/oxidizer mixture, determining whether conditions at the combustion system meet or exceed a first threshold operating parameter, transitioning to detonation combustion of the fuel/oxidizer mixture if conditions at the combustion system meet or exceed the first threshold operating parameter, and maintaining or increasing fuel flow through a deflagrative fuel circuit if conditions at the combustion system do not meet or exceed the first threshold operating parameter.

2. The method of any clause herein, the method comprising a control loop wherein fuel flow through the deflagrative fuel circuit is increased until conditions at the combustion system meet or exceed the first threshold operating parameter.

3. The method of any clause herein, wherein transitioning to detonation combustion comprises adjusting a fuel split between the deflagration fuel circuit and a detonation fuel circuit.

4. The method of any clause herein, the method comprising initializing and/or sustaining detonation of the fuel/oxidizer mixture at the combustion chamber.

5. The method of any clause herein, the method comprising adjusting fuel flow through the deflagrative fuel circuit based at least on a desired operating condition at the combustion system.

6. The method of any clause herein, the method comprising a control loop wherein fuel flow through the deflagrative fuel circuit is increased or decreased based at least on the first threshold operating parameter and a second threshold operating parameter.

7. The method of any clause herein, wherein the first threshold operating parameter corresponds to a minimum pressure for detonation of the fuel/oxidizer mixture at the combustion system.

8. The method of any clause herein, wherein the second threshold operating parameter corresponds to a maximum pressure for detonation of the fuel/oxidizer mixture at the combustion system.

9. The method of any clause herein, wherein the second threshold operating parameter corresponds to a maximum temperature of gases exiting the combustion system.

10. The method of any clause herein, the method comprising determining whether conditions at the combustion system exceed a second threshold operating parameter.

11. A combustion system, the combustion system defining an aft end at which gases exit and a forward end at which a flow of oxidizer enters, the combustion system comprising an outer wall at least partially defining a combustion chamber, a deflagrative fuel circuit configured to provide a first flow of fuel to the combustion chamber, a detonation fuel circuit configured to provide a second flow of fuel to the combustion chamber, and a control valve positioned at one or more of the deflagrative fuel circuit or the detonation fuel circuit, the control valve configured to adjust a fuel split of a total flow fuel between the deflagrative fuel circuit and the detonation fuel circuit, and a controller configured to store instructions that, when executed, perform operations, the operations comprising determining whether conditions at the combustion system meet or exceed a first threshold operating parameter, transitioning to detonation combustion of the fuel/oxidizer mixture if conditions at the combustion system meet or exceed the first threshold operating parameter, and maintaining or increasing fuel flow through the deflagrative fuel circuit if conditions at the combustion system do not meet or exceed the first threshold operating parameter.

12. The combustion system of any clause herein, wherein transitioning to detonation combustion comprises adjusting, at the control valve, a fuel split between the deflagration fuel circuit and a detonation fuel circuit.

13. The combustion system of any clause herein, the operations comprising, initializing and/or sustaining detonation of the fuel/oxidizer mixture at the combustion chamber when conditions at the combustion system meet or exceed the first threshold operating parameter.

14. The combustion system of any clause herein, wherein initializing and/or sustaining detonation of the fuel/oxidizer mixture at the combustion chamber occurs when conditions at the combustion system do not exceed a second threshold operating parameter.

15. The combustion system of any clause herein, wherein the first threshold operating parameter corresponds to a minimum pressure of oxidizer entering the combustion chamber or gases exiting the combustion system.

16. The combustion system of any clause herein, wherein the second threshold operating parameter corresponds to a maximum pressure of oxidizer entering the combustion chamber or gases exiting the combustion system, or a maximum temperature of gases exiting the combustion system.

17. The combustion system of any clause herein, the operations comprising, determining whether conditions at the combustion system exceed a second threshold operating parameter.

18. The combustion system of any clause herein, comprising a purge circuit configured to provide a flow of oxidizer or inert gas to the deflagrative fuel circuit.

19. The combustion system of any clause herein, the operations comprising adjusting fuel flow through the deflagrative fuel circuit based at least on a desired operating condition at the combustion system, wherein fuel flow through the deflagrative fuel circuit is increased until conditions at the combustion system meet or exceed the first threshold operating parameter, and wherein fuel flow through the deflagrative fuel circuit is decreased until conditions at the combustion system do not exceed a second threshold operating parameter.

20. A heat engine, the engine comprising a compressor section, an expansion section, a multi-mode combustion system positioned in serial flow arrangement between the compressor section and the expansion section, the combustion system comprising an outer wall at least partially defining a combustion chamber, a deflagrative fuel circuit configured to provide a first flow of fuel to the combustion chamber, a detonation fuel circuit configured to provide a second flow of fuel to the combustion chamber, and a control valve positioned at one or more of the deflagrative fuel circuit or the detonation fuel circuit, the control valve configured to adjust a fuel split of a total flow fuel between the deflagrative fuel circuit and the detonation fuel circuit.

21. The heat engine of any preceding clause, the heat engine comprising the combustion system of any preceding clause.

22. The heat engine of any preceding clause, the heat engine comprising a controller configured to execute steps of the method of any preceding clause.

23. The combustion system of any preceding clause, wherein the controller is configured to execute one or more steps of the method of any preceding clause.

What is claimed is:

1. A computer-implemented method for multi-mode operation of a combustion system, the method comprising:
    initializing combustion of a fuel/oxidizer mixture;
    determining whether conditions at the combustion system meet or exceed a first threshold operating parameter;
    transitioning to detonation combustion of the fuel/oxidizer mixture if conditions at the combustion system meet or exceed the first threshold operating parameter;
    during the transition to detonation combustion, sustaining detonation of the fuel/oxidizer mixture at the combustion system by adjusting a fuel flow through a deflagrative fuel circuit, wherein adjusting the fuel flow through the deflagrative fuel circuit comprises:
        maintaining or increasing the fuel flow through the deflagrative fuel circuit if the conditions at the combustion system do not meet or exceed the first threshold operating parameter;
        determining whether the conditions at the combustion system exceed a second threshold operating parameter; and
        decreasing the fuel flow through the deflagrative fuel circuit until the conditions at the combustion system do not exceed the second threshold operating parameter.

2. The computer-implemented method of claim 1, wherein transitioning to detonation combustion comprises adjusting a fuel split between the deflagration fuel circuit and a detonation fuel circuit.

3. The computer-implemented method of claim 1, further comprising:
    adjusting the fuel flow through the deflagrative fuel circuit based at least on a desired operating condition at the combustion system.

4. The computer-implemented method of claim 1, wherein the first threshold operating parameter corresponds to a minimum pressure for detonation of the fuel/oxidizer mixture at the combustion system.

5. The computer-implemented method of claim 4, wherein the second threshold operating parameter corresponds to a maximum pressure for detonation of the fuel/oxidizer mixture at the combustion system.

6. The computer-implemented method of claim 1, wherein the second threshold operating parameter corresponds to a maximum temperature of gases exiting the combustion system.

7. The computer-implemented method of claim 1, further comprising:
    providing a flow of oxidizer or inert gas to the deflagrative fuel circuit through a purge circuit.

8. The computer-implemented method of claim 1, wherein transitioning to detonation combustion comprises maintaining a constant total flow of fuel to the combustion system relative to a constant input of a flow of oxidizer entering the combustion system.

9. A combustion system, the combustion system defining an aft end at which gases exit and a forward end at which a flow of oxidizer enters, the combustion system comprising:
    an outer wall at least partially defining a combustion chamber;
    a deflagrative fuel circuit configured to provide a first flow of fuel to the combustion chamber;
    a detonation fuel circuit configured to provide a second flow of fuel to the combustion chamber; and
    a control valve positioned at one or more of the deflagrative fuel circuit or the detonation fuel circuit, the control valve configured to adjust a fuel split of a total flow fuel between the deflagrative fuel circuit and the detonation fuel circuit; and
    a controller configured to store instructions that, when executed, perform operations, the operations comprising:
        initializing combustion of a fuel/oxidizer mixture;
        determining whether conditions at the combustion system meet or exceed a first threshold operating parameter;
        transitioning to detonation combustion of the fuel/oxidizer mixture if conditions at the combustion system meet or exceed the first threshold operating parameter;
        during the transition to detonation combustion, sustaining detonation of the fuel/oxidizer mixture at the combustion system by adjusting a fuel flow through the deflagrative fuel circuit, wherein adjusting the fuel flow through the deflagrative fuel circuit comprises:
            maintaining or increasing the fuel flow through the deflagrative fuel circuit if the conditions at the combustion system do not meet or exceed the first threshold operating parameter;
            determining whether the conditions at the combustion system exceed a second threshold operating parameter; and
            decreasing the fuel flow through the deflagrative fuel circuit until the conditions at the combustion system do not exceed the second threshold operating parameter.

10. The combustion system of claim 9, wherein transitioning to detonation combustion comprises adjusting, at the control valve, the fuel split between the deflagration fuel circuit and the detonation fuel circuit.

11. The combustion system of claim 9, wherein the first threshold operating parameter corresponds to a minimum pressure of oxidizer entering the combustion chamber or gases exiting the combustion system.

12. The combustion system of claim 9, wherein the second threshold operating parameter corresponds to a maximum pressure of oxidizer entering the combustion chamber or gases exiting the combustion system, or a maximum temperature of gases exiting the combustion system.

13. The combustion system of claim 9, comprising:
    a purge circuit configured to provide a flow of oxidizer or inert gas to the deflagrative fuel circuit.

14. The combustion system of claim 9, wherein transitioning to detonation combustion comprises maintaining a constant total flow of fuel to the combustion system relative to a constant input of the flow of oxidizer entering the combustion system.

15. A heat engine, the heat engine comprising:
    a compressor section;
    an expansion section;
    a multi-mode combustion system positioned in serial flow arrangement between the compressor section and the expansion section, the multi-mode combustion system comprising:

an outer wall at least partially defining a combustion chamber;
a deflagrative fuel circuit configured to provide a first flow of fuel to the combustion chamber;
a detonation fuel circuit configured to provide a second flow of fuel to the combustion chamber; and
a control valve positioned at one or more of the deflagrative fuel circuit or the detonation fuel circuit, the control valve configured to adjust a fuel split of a total flow fuel between the deflagrative fuel circuit and the detonation fuel circuit; and
a controller configured to store instructions that, when executed, perform operations, the operations comprising:
initializing combustion of a fuel/oxidizer mixture;
determining whether conditions at the multi-mode combustion system meet or exceed a first threshold operating parameter;
transitioning to detonation combustion of the fuel/oxidizer mixture if conditions at the multi-mode combustion system meet or exceed the first threshold operating parameter; and
during the transition to detonation combustion, sustaining detonation of the fuel/oxidizer mixture at the multi-mode combustion system by adjusting a fuel flow through the deflagrative fuel circuit, wherein adjusting the fuel flow through the deflagrative fuel circuit comprises:
maintaining or increasing the fuel flow through the deflagrative fuel circuit if the conditions at the multi-mode combustion system do not meet or exceed the first threshold operating parameter;
determining whether the conditions at the multi-mode combustion system exceed a second threshold operating parameter; and
decreasing the fuel flow through the deflagrative fuel circuit until the conditions at the multi-mode combustion system do not exceed the second threshold operating parameter.

16. The heat engine of claim 15, wherein transitioning to detonation combustion comprises maintaining a constant total flow of fuel to the multi-mode combustion system relative to a constant input of a flow of oxidizer entering the multi-mode combustion system.

17. The heat engine of claim 15, wherein transitioning to detonation combustion comprises adjusting, at the control valve, the fuel split between the deflagration fuel circuit and the detonation fuel circuit.

18. The heat engine of claim 15, wherein the first threshold operating parameter corresponds to a minimum pressure of oxidizer entering the combustion chamber or gases exiting the multi-mode combustion system.

19. The heat engine of claim 15, wherein the second threshold operating parameter corresponds to a maximum pressure of oxidizer entering the combustion chamber or gases exiting the multi-mode combustion system, or a maximum temperature of gases exiting the multi-mode combustion system.

20. The heat engine of claim 15, wherein the multi-mode combustion system comprises:
a purge circuit configured to provide a flow of oxidizer or inert gas to the deflagrative fuel circuit.

* * * * *